US011563215B2

(12) United States Patent
Lee et al.

(10) Patent No.: US 11,563,215 B2
(45) Date of Patent: Jan. 24, 2023

(54) BINDER FOR MANUFACTURING POSITIVE ELECTRODE OF LITHIUM SECONDARY BATTERY AND METHOD FOR MANUFACTURING POSITIVE ELECTRODE BY USING SAME

(71) Applicant: LG CHEM, LTD., Seoul (KR)

(72) Inventors: Choonghyeon Lee, Daejeon (KR); Doo Kyung Yang, Daejeon (KR); Taek Gyoung Kim, Daejeon (KR); Joo Hyeong Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 281 days.

(21) Appl. No.: 16/768,263

(22) PCT Filed: Nov. 16, 2018

(86) PCT No.: PCT/KR2018/014138
§ 371 (c)(1),
(2) Date: May 29, 2020

(87) PCT Pub. No.: WO2019/107815
PCT Pub. Date: Jun. 6, 2019

(65) Prior Publication Data
US 2020/0373579 A1    Nov. 26, 2020

(30) Foreign Application Priority Data

Nov. 30, 2017  (KR) .................. 10-2017-0162681
Aug. 16, 2018  (KR) .................. 10-2018-0095216

(51) Int. Cl.
| H01M 4/00 | (2006.01) |
| H01M 4/62 | (2006.01) |
| C08L 33/02 | (2006.01) |
| H01M 4/36 | (2006.01) |
| H01M 4/38 | (2006.01) |
| H01M 4/587 | (2010.01) |
| H01M 10/0525 | (2010.01) |
| H01M 4/02 | (2006.01) |

(52) U.S. Cl.
CPC ............ *H01M 4/622* (2013.01); *C08L 33/02* (2013.01); *H01M 4/364* (2013.01); *H01M 4/38* (2013.01); *H01M 4/587* (2013.01); *H01M 4/625* (2013.01); *H01M 10/0525* (2013.01); *C08L 2203/20* (2013.01); *C08L 2205/025* (2013.01); *H01M 2004/028* (2013.01)

(58) Field of Classification Search
CPC ........ H01M 4/622; H01M 4/364; H01M 4/38; H01M 4/587; H01M 4/625; H01M 10/0525; H01M 2004/028; H01M 4/382; H01M 4/13; H01M 10/052; C08L 33/02; C08L 2203/20; C08L 2205/025; Y02E 60/10
See application file for complete search history.

(56) References Cited

U.S. PATENT DOCUMENTS

| 2012/0183848 A1 | 7/2012 | Kang et al. |
| 2013/0236778 A1 | 9/2013 | Choi et al. |
| 2015/0072248 A1 | 3/2015 | Watanabe et al. |
| 2015/0340698 A1* | 11/2015 | Take .............. H01M 10/0525 |
| | | 429/212 |
| 2015/0372291 A1 | 12/2015 | Ryu et al. |
| 2017/0018770 A1 | 1/2017 | Hori et al. |
| 2017/0117539 A1 | 4/2017 | Ogata et al. |
| 2017/0324094 A1 | 11/2017 | Sugiyama et al. |

FOREIGN PATENT DOCUMENTS

| CN | 102569730 A | 7/2012 |
| CN | 104221203 A | 12/2014 |
| CN | 106356535 A | 1/2017 |
| JP | 2009-252348 A | 10/2009 |
| JP | 2010-518581 A | 5/2010 |
| JP | 10-2014-0127886 A | 11/2014 |
| JP | 2015-225734 A | 12/2015 |
| JP | 2017-73237 A | 4/2017 |
| KR | 10-2011-0098111 A | 9/2011 |
| KR | 10-2013-0104013 A | 9/2013 |
| KR | 10-2014-0117013 A | 10/2014 |
| KR | 10-2015-0028662 A | 3/2015 |
| KR | 10-1583948 B1 | 1/2016 |
| KR | 10-2017-0008178 A | 1/2017 |
| KR | 10-2017-0047095 A | 5/2017 |
| KR | 10-2017-0063887 A | 6/2017 |
| WO | WO 2008/097723 A1 | 8/2008 |
| WO | WO 2013/141195 A1 | 9/2013 |

OTHER PUBLICATIONS

Peled et al. "The Effect of Binders on the Performance and Degradation of the Lithium/Sulfur Battery Assembled in the Discharged State", 2017 J. Electrochem. Soc. 164 A5001 (Year: 2017).*
Extended European Search Report for European Application No. 18883221.6, dated Dec. 2, 2020.
Pieczonka et al. "Lithium Polyacrylate (LiPAA) as an Advanced Binder and a Passivating Agent for High-Voltage Li-Ion Batteries", Adv. Energy Mater, vol. 5, 2015, pp. 1-10, 1501008.
International Search Report (PCT/ISA/210) issued in PCT/KR2018/014138, dated Apr. 19, 2019.

* cited by examiner

*Primary Examiner* — Nicholas P D'Aniello
(74) *Attorney, Agent, or Firm* — Birch, Stewart, Kolasch & Birch, LLP

(57) ABSTRACT

A binder for preparing a positive electrode of a lithium secondary battery, and a method for preparing a positive electrode using the same. The binder includes two or more different lithium-substituted polyacrylic acids with different molecular weights. The lithium-substituted polyacrylic acids include two different lithium-substituted polyacrylic acids differing in weight average molecular weight by 500,000 or more from each other.

10 Claims, No Drawings

BINDER FOR MANUFACTURING POSITIVE ELECTRODE OF LITHIUM SECONDARY BATTERY AND METHOD FOR MANUFACTURING POSITIVE ELECTRODE BY USING SAME

TECHNICAL FIELD

This application claims priority to and the benefits of Korean Patent Application No. 10-2017-0162681, filed with the Korean Intellectual Property Office on Nov. 30, 2017, and Korean Patent Application No. 10-2018-0095216, filed with the Korean Intellectual Property Office on Aug. 16, 2018, the entire contents of which are incorporated herein by reference.

The present invention relates to a binder for preparing a positive electrode of a lithium secondary battery and a method for preparing a positive electrode using the same. In particular, the present invention relates to a binder for preparing a positive electrode of a lithium secondary battery including two or more types of lithium-substituted polyacrylic acid with different molecular weights, and a method for preparing a positive electrode using the same.

BACKGROUND ART

As application areas of secondary batteries expand to electric vehicles (EV), energy storage systems (ESS) or the like, lithium-ion secondary batteries having relative low weight to energy storage density (~250 Wh/kg) have limits in applications for such products. On the other hand, a lithium-sulfur battery among lithium secondary batteries is capable of accomplishing high weight to energy storage density (~2,600 Wh/kg) theoretically, and thereby has received attention as a next generation secondary battery technology.

A lithium-sulfur battery means a battery system using a sulfur series material having a sulfur-sulfur (S—S) bond as a positive electrode active material, and lithium metal as a negative electrode active material. Sulfur, a main material of the positive electrode active material, has advantages of being very abundant in resources globally, having no toxicity and having a low atomic weight.

During discharge of a lithium-sulfur battery, lithium, a negative electrode active material, is oxidized while releasing electrons and being ionized, and a sulfur series material, a positive electrode active material, is reduced by receiving the electrons. Herein, the oxidation reaction of lithium is a process in which lithium metal releases electrons and changes into a lithium cation form. In addition, the reduction reaction of sulfur is a process in which an S—S bond receives two electrons and changes into a sulfur anion form. The lithium cation produced through the oxidation reaction of lithium is transferred to a positive electrode through an electrolyte, and forms a salt by bonding with the sulfur anion produced through the reduction reaction of sulfur. Specifically, sulfur before discharge has a cyclic $S_8$ structure, and it changes to lithium polysulfide ($LiS_x$) through a reduction reaction. When the lithium polysulfide is fully reduced, lithium sulfide ($Li_2S$) is produced.

Despite the lithium-sulfur battery having an advantage of high energy storage density, many problems are present in actual applications. Specifically, a problem of instability of lithium metal used as a negative electrode, a problem of low conductivity of a positive electrode, a problem of sulfur series material sublimation when preparing an electrode, a problem of sulfur series material loss during repeated charge and discharge, and the like, may be present.

Existing positive electrodes for a lithium-sulfur battery have been prepared using styrene butadiene rubber/carboxymethyl cellulose (SBR/CMC) as a binder. However, dispersibility was reduced when a thickener such as CMC was not present in the binder, and a problem of a long-term stability decrease caused by positive electrode deterioration as charge and discharge proceed has been identified.

Accordingly, binders capable of improving lithium-sulfur battery performance still have been required in the art.

PRIOR ART DOCUMENTS

Patent Documents (Patent Document 1) Korean Patent No. 10-1583948

DISCLOSURE

Technical Problem

In view of the above, an aspect of the present invention provides, by using a binder including two or more types of lithium-substituted polyacrylic acid with different molecular weights, a binder for preparing a positive electrode of a lithium secondary battery having a high solid content when prepared to slurry, having enhanced processability by increasing flowability of the slurry, and capable of improving adhesion and cycle properties in an electrode when used in a battery.

Technical Solution

According to a first aspect of the present invention, there is provided a binder for preparing a positive electrode of a lithium secondary battery including two or more different lithium-substituted polyacrylic acids, wherein the two or more different lithium substituted polyacrylic acids have with different molecular weights.

In one embodiment of the present invention, the two or more lithium-substituted polyacrylic acid includes two different lithium-substituted polyacrylic acids differing in weight average molecular weight by 500,000 or more from each other.

In one embodiment of the present invention, the two or more lithium-substituted polyacrylic acids include a high molecular weight lithium-substituted polyacrylic acid having a weight average molecular weight of 1,000,000 to 2,000,000.

In one embodiment of the present invention, the high molecular weight lithium-substituted polyacrylic acid is included in 20% by weight to 70% by weight based on a total of whole lithium-substituted polyacrylic acids.

In one embodiment of the present invention, the two or more lithium-substituted polyacrylic acids include a low molecular weight lithium-substituted polyacrylic acid having a weight average molecular weight of 5,000 to 800,000.

In one embodiment of the present invention, the low molecular weight lithium-substituted polyacrylic acid is included in 30% by weight to 80% by weight based on a total of lithium-substituted polyacrylic acids.

In one embodiment of the present invention, the binder has a viscosity of 500 cP to 50,000 cP in an aqueous solution state of 2.5% by weight under a temperature condition of 25° C.

According to a second aspect of the present invention, there is provided a composition for preparing a positive electrode of a lithium secondary battery including a binder, a positive electrode active material and a conductor.

In one embodiment of the present invention, the composition includes the binder in 0.01 parts by weight to 10 parts by weight with respect to 100 parts by weight of solids in the composition.

In one embodiment of the present invention, the composition includes the positive electrode active material in 30 parts by weight to 95 parts by weight with respect to 100 parts by weight of solids in the composition.

In one embodiment of the present invention, the composition includes the conductor in 2 parts by weight to 65 parts by weight with respect to 100 parts by weight of solids in the composition.

According to a third aspect of the present invention, there is provided a positive electrode including a current collector, and a positive electrode active material layer formed by coating the above-described composition on the current collector.

According to a fourth aspect of the present invention, there is provided a lithium secondary battery including the above-described positive electrode.

Advantageous Effects

The present invention provides a binder including two or more types of lithium-substituted polyacrylic acid with different molecular weights. In the lithium-substituted polyacrylic acid, lithium-substituted polyacrylic acid having a relatively high molecular weight is capable of enhancing adhesive strength of the binder and lifetime stability in a battery. In addition, in the lithium-substituted polyacrylic acid, lithium-substituted polyacrylic acid having a relatively low molecular weight is capable of increasing processability of the binder by increasing a solid content and flowability in slurry. Accordingly, the binder according to the present invention exhibits excellent adhesive strength when used in a battery while being readily processed, and accordingly, is capable of improving lifetime properties of a lithium secondary battery.

BEST MODE

Embodiments provided according to the present invention may all be accomplished by the descriptions provided below. The following descriptions need to be understood as describing preferred embodiments of the present invention, and it needs to be understood that the present invention is not limited thereto.

Binder

The present invention provides a binder for preparing a positive electrode of a lithium secondary battery including two or more types of lithium-substituted polyacrylic acid (lithiated polyacrylic acid) with different molecular weights.

In the field of a lithium secondary battery, styrene butadiene rubber/carboxymethyl cellulose (SBR/CMC) has been normally used as a binder when preparing a positive electrode. Herein, carboxymethyl cellulose is an additive used for improving binder dispersibility as a thickener, and when using only styrene butadiene rubber without the carboxymethyl cellulose, decrease in dispersity leads to decline in binder processability, and long-term stability decreases due to deterioration of a positive electrode in charge and discharge process. Polyacrylic acid or lithium-substituted polyacrylic acid has been used alone in order to secure long-term stability of a positive electrode without adding a thickener and the like. However, polyacrylic acid used for improving battery performance is in a low concentration in a binder solution due to a high molecular weight and chemical properties resulting therefrom, and has a low solid content when preparing slurry. As a result, binder processability has declined. Such decline in the processability has led to a decrease in the electrode flexibility when used in an electrode. The present invention resolves the above-mentioned problem by, while basically using lithium-substituted polyacrylic acid, properly combining two or more lithium-substituted polyacrylic acid with different molecular weights.

Lithium-substituted polyacrylic acid, a basic material of the binder according to the present invention, has a form in which hydrogen of a carboxyl group (COOH) is substituted with lithium in polyacrylic acid. The lithium-substituted polyacrylic acid may be formed through a neutralization reaction after introducing a base including lithium to polyacrylic acid. The lithium-substituted polyacrylic acid is preferably formed in a completely neutralized state of polyacrylic acid by introducing the base so that the amounts of the carboxyl group of the polyacrylic acid and the lithium become 1:1 in a molar ratio. When the polyacrylic acid is not completely neutralized, side reactions may occur by hydrogen generated from the polyacrylic acid. In addition, when the base is added in an excessive amount, lifetime properties of a battery may be deteriorated by the base not participating in the neutralization reaction. By the lithium substitution described above, polarity of the polyacrylic acid increases and dispersibility in the solvent is enhanced. The binder according to the present invention includes two or more types of lithium-substituted polyacrylic acid with different molecular weights. The two or more types of lithium-substituted polyacrylic acid may be largely divided into lithium-substituted polyacrylic acid having a relatively high molecular weight and lithium-substituted polyacrylic acid having a relatively low molecular weight. Herein, the lithium-substituted polyacrylic acid having a relatively high molecular weight may contribute to increasing adhesive strength of the binder and enhancing lifetime stability of a battery, and the lithium-substituted polyacrylic acid having a relatively low molecular weight may contribute to increasing a solid content when preparing slurry, and enhancing binder processability by increasing slurry flowability. In the binder according to the present invention, the lithium-substituted polyacrylic acid having a relatively high molecular weight and the lithium-substituted polyacrylic acid having a relatively low molecular weight have a molecular weight difference of a certain level or higher. According to one embodiment of the present invention, the lithium-substituted polyacrylic acid may include two types of lithium-substituted polyacrylic acid differing in weight average molecular weight by 500,000 or more, preferably 500,000 to 2,000,000, and more preferably 500,000 to 800,000 from each other. When the binder does not include two types of lithium-substituted polyacrylic acid differing in weight average molecular weight by 500,000 or more from each other, effects obtained by the high molecular weight lithium-substituted polyacrylic acid and effects obtained by the low molecular weight lithium-substituted polyacrylic acid may not be obtained at the same time.

The binder according to the present invention may include high molecular weight lithium-substituted polyacrylic acid having a weight average molecular weight of 1,000,000 to 2,000,000 and preferably 1,250,000 to 1,750,000. When the high molecular weight lithium-substituted polyacrylic acid has a weight average molecular weight of less than 1,000,000, effects of improving adhesion properties of an electrode and cycle properties of a battery are insignificant. In contrast, when the high molecular weight lithium-substituted polyacrylic acid has a weight average molecular weight of more than 2,000,000, binder processability significantly decline, and the processability is difficult to be recovered even by mixing with the low molecular weight lithium-substituted polyacrylic acid. According to one embodiment of the present invention, the high molecular weight lithium-substituted polyacrylic acid may be included in 20% by weight to 70% by weight and preferably in 25% by weight to 50% by weight based on the whole lithium-substituted polyacrylic acid. When the high molecular weight lithium-substituted polyacrylic acid is included in less than 20% by weight, binder adhesive strength and battery cycle performance significantly decline, and when the high molecular weight lithium-substituted polyacrylic acid is included in more than 70% by weight, binder processability significantly decline.

The binder according to the present invention may include low molecular weight lithium-substituted polyacrylic acid having a weight average molecular weight of 5,000 to 800,000 and preferably 450,000 to 750,000. The low molecular weight lithium-substituted polyacrylic acid having a weight average molecular weight of less than 5,000 may adversely affect adhesion properties of an electrode and cycle performance of a battery. In contrast, when the low molecular weight lithium-substituted polyacrylic acid has a weight average molecular weight of more than 800,000, effects of enhancing binder processability obtained by the introduction of the low molecular weight lithium-substituted polyacrylic acid and improving battery performance obtained therefrom are insignificant. According to one embodiment of the present invention, the low molecular weight lithium-substituted polyacrylic acid may be included in 30% by weight to 80% by weight and preferably in 50% by weight to 75% by weight based on the whole lithium-substituted polyacrylic acid. When the low molecular weight lithium-substituted polyacrylic acid is included in less than 30% by weight, binder processability is lowered and thus electrode flexibility decreases, and when the low molecular weight lithium-substituted polyacrylic acid is included in more than 80% by weight, binder adhesive strength and battery cycle performance significantly decline.

The binder according to the present invention may have viscosity of 500 cP to 50,000 cP and preferably 1,000 cP to 50,000 cP in an aqueous solution state of 2.5% by weight under a temperature condition of 25° C., and within the viscosity range, the binder may accomplish high processability and high adhesive strength.

Positive Electrode for Lithium Secondary Battery

The present invention provides a composition for preparing a positive electrode of a lithium secondary battery including the binder described above, a positive electrode active material and a conductor. The positive electrode for a lithium secondary battery is prepared by coating the composition on a positive electrode current collector.

The ratio of the binder in the composition may be selected considering target battery performance. According to one embodiment of the present invention, the composition includes the binder in 0.01 parts by weight to 10 parts by weight with respect to 100 parts by weight of solids in the composition. The solids in the composition becoming a base of the content mean solid components in the composition excluding a solvent, monomers that may be included in the binder and the like.

With the binder according to the present invention described above, binders generally used in the art may be additionally used. As examples of the additional binder, one or more binders may be selected from the group consisting of fluorine resin-based binders including polyvinylidene fluoride (PVdF) or polytetrafluoroethylene (PTFE), rubber-based binders including styrene-butadiene rubber, acrylonitrile-butadiene rubber or styrene-isoprene rubber, polyalcohol-based binders, polyolefin-based binders including polyethylene or polypropylene, polyimide-based binders, polyester-based binder mussel adhesives, silane-based binders and polyacrylate-based binders. According to one embodiment of the present invention, the additional binder may be further included in the composition in 0.01 parts by weight to 10.0 parts by weight with respect to 100 parts by weight of solids in the composition.

The ratio of the positive electrode active material in the composition may be selected considering target battery performance. According to one embodiment of the present invention, the composition includes the positive electrode active material in 30 parts by weight to 95 parts by weight with respect to 100 parts by weight of solids in the composition. As the positive electrode active material, all positive electrode active materials usable in the art for a lithium secondary battery may be used. Specific examples of such a positive electrode active material may include lithium metal; lithium cobalt-based oxides such as $LiCoO_2$; lithium manganese-based oxides such as $Li_{1+x}Mn_{2-x}O_4$ (herein, x is from 0 to 0.33), $LiMnO_3$, $LiMn_2O_3$ or $LiMnO_2$; lithium copper oxides such as $Li_2CuO_2$; vanadium oxides such as $LiV_3O_8$, $LiFe_3O_4$, $V_2O_5$ or $Cu_2V_2O_7$; lithium nickel-based oxides expressed by $LiNi_{1-x}M_xO_2$ (herein, M=Co, Mn, Al, Cu, Fe, Mg, B or Ga, and x=0.01 to 0.3); lithium manganese composite oxides expressed by $LiMn_{2-x}M_xO_2$ (herein, M=Co, Ni, Fe, Cr, Zn or Ta, and x=0.01 to 0.1) or $Li_2Mn_3MO_8$ (herein, M=Fe, Co, Ni, Cu or Zn); lithium-nickel-manganese-cobalt-based oxides expressed by $Li(Ni_aCo_bMn_c)O_2$ (herein, 0<a<1, 0<b<1, 0<c<1, a+b+c=1); sulfur or disulfide compounds; phosphates such as $LiFePO_4$, $LiMnPO_4$, $LiCoPO_4$ or $LiNiPO_4$; $Fe_2(MoO_4)_3$ and the like, but are not limited thereto.

Particularly, when the lithium secondary battery is a lithium-sulfur battery, the positive electrode active material may be selected from among elemental sulfur ($S_8$), sulfur-carbon composites, sulfur series compounds or mixtures thereof, but is not limited thereto. The sulfur series compound may specifically be $Li_2S_n (n≥1)$, an organosulfur compound, a carbon-sulfur polymer $((C_2S_x)_n$: x=2.5 to 50, n≥2) or the like. A sulfur material alone does not have electrical conductivity, and therefore, is composited with a conductor when used.

In addition, the sulfur-carbon composite is one aspect of a positive electrode active material mixing carbon and sulfur in order to reduce the sulfur from being leaked to an electrolyte, and to increase electrical conductivity of the electrode including sulfur.

The carbon material forming the sulfur-carbon composite may be crystalline or amorphous carbon, and may be conductive carbon. Specifically, the carbon material may be selected from the group consisting of graphite, graphene, Super P, carbon black, denka black, acetylene black, ketjen black, channel black, furnace black, lamp black, thermal black, carbon fibers, carbon nanofibers, carbon nanotubes, carbon nanowires, carbon nanorings, carbon fabrics and fullerene ($C_{60}$).

Such a sulfur-carbon composite includes a sulfur-carbon nanotube composite. Specifically, the sulfur-carbon nanotube composite is provided with a three-dimensional-structured carbon nanotube aggregate, and sulfur or a sulfur compound provided on at least a part of an internal surface and an outer surface of the carbon nanotube aggregate.

The sulfur-carbon nanotube composite according to one embodiment of the present invention has sulfur present inside the three-dimensional structure of the carbon nanotube, and even when soluble polysulfide is produced by an electrochemical reaction, the three-dimensionally entangled structure is maintained even with polysulfide elution when located inside the carbon nanotube, and collapse of the positive electrode structure may be suppressed. As a result, a lithium-sulfur battery including the sulfur-carbon nanotube composite has an advantage of obtaining high capacity even with high loading. In addition, the sulfur or the sulfur series compound may also be provided in pores inside the carbon nanotube aggregate.

The carbon nanotube means linear conductive carbon, and specifically, carbon nanotubes (CNT), graphitic nanofibers (GNF), carbon nanofibers (CNF) or activated carbon fibers (ACF) may be used, and single-walled carbon nanotubes (SWCNT) or multi-walled carbon nanotube (MWCNT) may all be used.

According to one embodiment of the present invention, the sulfur-carbon composite is prepared by impregnating sulfur or a sulfur series compound into an outer surface and inside of the carbon, and selectively, a step of adjusting a carbon diameter may be included before, after, or before and after the impregnating. The impregnating may be performed by mixing carbon with sulfur or sulfur series compound powder, heating the result, and impregnating the melted sulfur or sulfur series compound into carbon, and a dry ball mill method, a dry jet mill method or a dry dyno mill method may be used during such mixing.

The ratio of the conductor in the composition may be selected considering target battery performance. According to one embodiment of the present invention, the composition includes the conductor in 2 parts by weight to 65 parts by weight with respect to 100 parts by weight of solids in the composition. The conductor may be selected from among graphite such as natural graphite or artificial graphite; carbon black such as carbon black, acetylene black, ketjen black, channel black, furnace black, lamp black or thermal black; conductive fibers such as carbon fiber or metal fiber; fluorocarbon; metal powder such as nickel powder or aluminum powder; conductive whiskers such as zinc oxide or potassium titanate; conductive metal oxides such as titanium oxide; or polyphenylene derivatives, but is not limited thereto.

The composition may further include other components in addition to the binder, the positive electrode active material and the conductor described above. The component that may be further added to the composition includes a crosslinking agent or a conductor dispersant. In order for a polymer of the binder forms a crosslinking network, a crosslinking agent having two or more functional groups capable of reacting with a crosslinkable functional group of the polymer may be used as the crosslinking agent. The crosslinking agent is not particularly limited, but may be selected from among an isocyanate crosslinking agent, an epoxy crosslinking agent, an aziridine crosslinking agent or a metal chelate crosslinking agent. According to one embodiment of the present invention, the crosslinking agent may be preferably an isocyanate crosslinking agent. The crosslinking agent may be further included in the composition in 0.0001 parts by weight to 1 parts by weight based on 100 parts by weight of solids in the composition.

The conductor dispersant helps with dispersing the non-polar carbon-based conductor and forming a paste. The conductor dispersant is not particularly limited, but may be selected from among cellulose-based compounds including carboxymethyl cellulose (CMC), starch, hydroxypropyl cellulose or regenerated cellulose, polyvinyl alcohol (PVA) and polyvinyl pyrrolidone (PVP). According to one embodiment of the present invention, the conductor dispersant may be preferably polyvinyl alcohol (PVA). The conductor dispersant may be further included in the composition in 0.1 parts by weight to 20 parts by weight with respect to 100 parts by weight of solids in the composition.

In forming the composition, a solvent may be used. Types of the solvent may be properly selected considering target battery performance and the like. According to one embodiment of the present invention, the solvent may be selected from among organic solvents such as N-methyl-2-pyrrolidone, propylene carbonate, ethylene carbonate, butylene carbonate, dimethyl carbonate, diethyl carbonate, gamma-butyrolactone, 1,2-dimethoxyethane, tetrahydrofuran, 2-methyltetrahydrofuran, dimethyl sulfoxide, formamide, dimethylformamide, acetonitrile, nitromethane, methyl formate, methyl acetate, phosphate triester, trimethoxymethane, sulfolane, methyl sulfolane, 1,3-dimethyl-2-imidazolidinone, propylene carbonate derivatives, tetrahydrofuran derivatives, methyl propionate or ethyl propionate, and water. Using water as the solvent is advantageous in terms of a drying temperature or environmental aspects.

The composition described above is coated on a positive electrode current collector to form a positive electrode active layer. Accordingly, the positive electrode of a lithium secondary battery includes a positive electrode current collector, and a positive electrode active layer formed on the positive electrode current collector.

The positive electrode current collector is not particularly limited as long as it is generally used in the preparation of a positive electrode. According to one embodiment of the present invention, types of the positive electrode current collector may include one or more materials selected from among stainless steel, aluminum, nickel, titanium, baked carbon and aluminum, and when necessary, a surface of the material may be treated with carbon, nickel, titanium or silver to be used. According to one embodiment of the present invention, a form of the positive electrode current collector may be selected from among films, sheets, foil, nets, porous bodies, foams and non-woven fabrics. The thickness of the positive electrode current collector is not particularly limited, and may be set to have a proper range considering mechanical strength of the positive electrode, productivity, battery capacity or the like.

The method of forming a positive electrode active layer on the current collector uses known coating methods and is not particularly limited. Examples of the coating method may include a bar coating method, a screen coating method, a doctor blade method, a dip method, a reverse roll method, a direct roll method, a gravure method or an extrusion method. The amount of the positive electrode active layer coated on the current collector is not particularly limited, and is adjusted considering a final target thickness of the positive electrode active layer. In addition, known processes required for positive electrode preparation, for example, an extrusion or drying process, may be performed before or after the process of the forming of a positive electrode active layer. The thickness of the active layer formed using the composition may be properly selected considering target performance, and is not particularly limited. According to one embodiment of the present invention, the active layer preferably has a thickness of 1 μm to 200 μm.

Lithium Secondary Battery

The present invention provides a lithium secondary battery having improved battery performance by adding constitutions of a negative electrode, a separator and an electrolyte solution to the above-described positive electrode. In one embodiment of the present invention, the lithium secondary battery may be preferably a lithium-sulfur battery.

The electrolyte solution forming the lithium secondary battery according to the present invention is not particularly limited as long as it is a non-aqueous solvent performing a role of a medium through which ions involved in an electrochemical reaction of the battery may migrate. According to one embodiment of the present invention, carbonate-based, ester-based, ether-based, ketone-based, alcohol-based or aprotic solvents may be used as the solvent. Specific examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC) or the like. Specific examples of the ester-based solvent may include methyl acetate, ethyl acetate, n-propyl acetate, 1,1-dimethylethyl acetate, methyl propionate, ethyl propionate, γ-butyrolactone, decanolide, valerolactone, mevalonolactone, carprolactone or the like. Specific examples of the ether-based solvent may include diethyl ether, dipropyl ether, dibutyl ether, dimethoxymethane, trimethoxymethane, dimethoxyethane, diethoxyethane, diglyme, triglyme, tetraglyme, tetrahydrofuran, 2-methyltetrahydrofuran, polyethylene glycol dimethyl ether or the like. Specific examples of the ketone-based solvent may include cyclohexanone. Specific examples of the alcohol-based solvent may include ethyl alcohol, isopropyl alcohol or the like. Specific examples of the aprotic solvent may include nitriles such as acetonitrile, amides such as dimethylformamide, dioxolanes such as 1,3-dioxolane (DOL), sulfolane or the like. The non-aqueous organic solvent may be used either alone or as a mixture of one or more thereof, and when used as a mixture of one or more thereof, the mixing ratio may be properly adjusted depending on target battery performance, and particularly, a solvent mixing 1,3-dioxolane and dimethoxyethane in a volume ratio of 1:1 may be preferred.

The negative electrode of the lithium secondary battery according to the present invention includes a negative electrode current collector, and a negative electrode active material layer formed on the negative electrode current collector.

The negative electrode active material layer includes a negative electrode active material, a binder and a conductor. As the negative electrode active material, a material capable of reversibly intercalating or deintercalating lithium ions ($Li^+$), a material capable of reversibly forming a lithium-containing compound by reacting with lithium ions, lithium metal or a lithium alloy may be used. Examples of the material capable of reversibly intercalating or deintercalating lithium ions ($Li^+$) may include crystalline carbon, amorphous carbon or a mixture thereof. Examples of the material capable of reversibly forming a lithium-containing compound by reacting with lithium ions ($Li^+$) may include tin oxide, titanium nitrate or silicon. Examples of the lithium alloy may include alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn).

The binder is not limited to the binder described above, and those that may be used as a binder in the art may all be used.

As for constitutions such as the current collector other than the negative electrode active material and the conductor, the materials, the methods and the like used in the positive electrode described above may be used.

The separator of the lithium secondary battery according to the present invention is a physical separator having a function of physically separating the electrodes, and is not particularly limited as long as it is used as common separators, and those having an excellent electrolyte solution moisture-containing ability while having low resistance for ion migration of the electrolyte liquid are particularly preferred.

In addition, the separator enables lithium ion transfer between the positive electrode and the negative electrode while separating or insulating the positive electrode and the negative electrode from each other. Such a separator may be formed with porous, that is, 30% to 50% porosity, and non-conductive or insulating materials.

Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used, or non-woven fabrics made of high melting point glass fiber or the like may be used. Among these, a porous polymer film is preferably used.

When using a polymer film as both a buffer layer and the separator, the amount of electrolyte solution impregnation and ion conducting properties decline, and effects of reducing an overvoltage and improving capacity properties become insignificant. Meanwhile, when using a non-woven fabric material as the both, mechanical strength is not secured causing a battery short circuit problem. However, when using a film-type separator and a polymer non-woven fabric buffer layer together, mechanical strength may also be secured together with an effect of improving battery performance obtained by employing the buffer layer.

According to one preferred embodiment of the present invention, an ethylene homopolymer (polyethylene) polymer film is used as the separator, and a polyimide non-woven fabric is used as the buffer layer. Herein, the polyethylene polymer film preferably has a thickness of 10 μm to 25 μm and porosity of 40% to 50%.

Hereinafter, preferred examples are provided in order to illuminate the present invention, however, the following examples are provided in order to more readily understand the present invention, and the scope of the present invention is not limited thereto.

EXAMPLE

Example 1

1. Preparation of Positive Electrode

First polyacrylic acid (product of Sigma-Aldrich, molecular weight: 1,250,000) and second polyacrylic acid (product of Sigma-Aldrich, molecular weight: 450,000) were mixed in a weight ratio of 2:5. The obtained mixture was completely neutralized with lithium hydroxide (product of Sigma-Aldrich, LiOH) to prepare a binder of lithium-substituted polyacrylic acid. Viscosity of the binder was measured as 1,290 cP in an aqueous solution state of 2.5% by weight under a temperature condition of 25° C. In addition, sulfur (product of Sigma-Aldrich) was mixed with carbon nanotubes (CNT) using a ball mill, and then the result was heat treated at 155° C. to prepare a positive electrode active material of a sulfur-carbon composite. As a conductor, vapor-grown carbon fiber (VGCF) was prepared. The positive electrode active material, the conductor and the binder described above were added to water, a solvent, and mixed using a mixer to prepare a composition for forming a positive electrode active layer. Herein, the employed mixing ratio was positive electrode active material:conductor:binder=88:5:7 in a weight ratio. After coating the prepared composition for forming a positive electrode active material layer on an aluminum foil current collector, the result was dried for 2 hours at 50° C. to prepare a positive electrode (energy density of positive electrode: 5.5 mAh/cm$^2$).

2. Manufacture of Lithium Secondary Battery

With the positive electrode prepared using the method described above, a negative electrode, a separator and an electrolyte solution were prepared as follows to assemble a lithium secondary battery.

(1) Negative Electrode

Lithium foil having a thickness of approximately 40 μm was used as the negative electrode.

(2) Separator

A polyethylene film was used as the separator.

(3) Electrolyte Solution

As the electrolyte solution, an electrolyte solution obtained by adding 0.75 M LiFSI and 3% by weight LiNO$_3$ to a mixed solvent of ethylene glycol ethylmethyl ether (EGEME) and 2-methyltetrahydrofuran (2-Me-THF) (2:1, v/v) was used.

Example 2

A lithium secondary battery was manufactured in the same manner as in Example 1 except that, when preparing the positive electrode, the binder of lithium-substituted polyacrylic acid was prepared after mixing first polyacrylic acid (product of Sigma-Aldrich, molecular weight: 1,250,000) and third polyacrylic acid (product of Scientific polymer products Inc., molecular weight: 750,000) in a weight ratio of 2:5, and then completely neutralizing the mixture with lithium hydroxide. Viscosity of the binder was measured as 40,000 cP in an aqueous solution state of 2.5% by weight under a temperature condition of 25° C.

Example 3

A lithium secondary battery was manufactured in the same manner as in Example 1 except that, when preparing the positive electrode, the binder of lithium-substituted polyacrylic acid was prepared after mixing first polyacrylic acid (product of Sigma-Aldrich, molecular weight: 1,250,000) and third polyacrylic acid (product of Scientific polymer products Inc., molecular weight: 750,000) in a weight ratio of 1:1, and then completely neutralizing the mixture with lithium hydroxide. Viscosity of the binder was measured as 50,000 cP in an aqueous solution state of 2.5% by weight under a temperature condition of 25° C.

Comparative Example 1

A lithium secondary battery was manufactured in the same manner as in Example 1 except that, when preparing the positive electrode, the binder of lithium-substituted polyacrylic acid was prepared by neutralizing just first polyacrylic acid (product of Sigma-Aldrich, molecular weight: 1,250,000) with lithium hydroxide.

Comparative Example 2

A lithium secondary battery was manufactured in the same manner as in Example 1 except that, when preparing the positive electrode, the binder of lithium-substituted polyacrylic acid was prepared by neutralizing just third polyacrylic acid (product of Scientific polymer products Inc., molecular weight: 750,000) with lithium hydroxide.

Comparative Example 3

A lithium secondary battery was manufactured in the same manner as in Example 1 except that, when preparing the positive electrode, the binder of lithium-substituted polyacrylic acid was prepared after mixing second polyacrylic acid (product of Sigma-Aldrich, molecular weight: 450,000) and third polyacrylic acid (product of Scientific polymer products Inc., molecular weight: 750,000) in a weight ratio of 5:2, and then completely neutralizing the mixture with lithium hydroxide.

Comparative Example 4

A lithium secondary battery was manufactured in the same manner as in Example 1 except that, when preparing the positive electrode, the binder of lithium-substituted polyacrylic acid was prepared after mixing first polyacrylic acid (product of Sigma-Aldrich, molecular weight: 1,250,000) and polyvinyl pyrrolidone (product of Sigma-Aldrich, molecular weight: 360,000) in a weight ratio of 5:2, and then completely neutralizing the mixture with lithium hydroxide.

Comparative Example 5

A lithium secondary battery was manufactured in the same manner as in Example 1 except that, when preparing the positive electrode, the binder of lithium-substituted polyacrylic acid was prepared after mixing first polyacrylic acid (product of Sigma-Aldrich, molecular weight: 1,250,000) and second polyacrylic acid (product of Sigma-Aldrich, molecular weight: 450,000) in a weight ratio of 1:9, and then completely neutralizing the mixture with lithium hydroxide.

Comparative Example 6

A lithium secondary battery was manufactured in the same manner as in Example 1 except that, when preparing the positive electrode, the binder of lithium-substituted polyacrylic acid was prepared after mixing first polyacrylic acid (product of Sigma-Aldrich, molecular weight: 1,250,000) and second polyacrylic acid (product of Sigma-Aldrich, molecular weight: 450,000) in a weight ratio of 4:1, and then completely neutralizing the mixture with lithium hydroxide.

Experimental Example

Method of Evaluating Binder Performance
1. Method of Measuring Adhesive Strength The electrode dried for 2 hours at 50° C. was cut to a size of 15 cm×2 cm, and adhered to slide glass having a double-sided tape attached thereto by the electrode surface, and 3 samples for a peel test were prepared through lamination. The sample for a peel test was loaded in an adhesive strength measurable UTM, and a 90° peel test was performed to measure applied peel resistance (gf/cm), and adhesion for each of the electrodes was calculated.

<Analysis Condition>
Sample width: 20 mm
Propagation speed: 300 mm/min
Data effective calculation interval: 10 mm to 40 mm 2. Method of Evaluating Cycle Properties Battery performance was measured by conducting charge and discharge under the following condition.

<Analysis Condition>
Device: 100 mA level charger/discharger
Charge: 0.3 C, constant current/constant voltage mode
Discharge: 0.5 C, constant current/constant voltage mode, 1.8 V
Cycle temperature: 25° C.

Experimental Example 1: Analysis on Battery Performance Depending on Discharge Capacity Charge and discharge were repeatedly conducted on each of the lithium secondary batteries manufactured according to the examples and the comparative examples under the analysis condition described above. During charge and discharge, discharge capacity at the $1^{st}$ cycle and discharge capacity at the $100^{th}$ cycle were measured, and the results are shown in Table 1.

TABLE 1

|  | Discharge Capacity (mAh/g) | | Capacity Retention Rate |
| --- | --- | --- | --- |
|  | $1^{st}$ Cycle | $100^{th}$ Cycle | (%) |
| Example 1 | 1,057 | 648 | 61.3 |
| Example 2 | 1,109 | 715 | 64.5 |
| Example 3 | 1,105 | 676 | 61.2 |
| Comparative Example 1 | 1,061 | 368 | 34.7 |
| Comparative Example 2 | 1,120 | 412 | 36.8 |
| Comparative Example 3 | 1,099 | 528 | 48.0 |
| Comparative Example 4 | 1,109 | 302 | 27.2 |
| Comparative Example 5 | 1,069 | 322 | 30.1 |
| Comparative Example 6 | 1,073 | 271 | 25.3 |

According to Table 1, it was identified that a capacity retention rate was significantly enhanced when using the binder including two types of lithium-substituted polyacrylic acid with a molecular weight difference of approximately 500,000 or more (Examples 1 to 3) compared to when using lithium-substituted polyacrylic acid alone (Comparative Examples 1 and 2).

In addition, it was identified that a capacity retention rate was significantly enhanced when using the binder including two types of lithium-substituted polyacrylic acid with a molecular weight difference of approximately 500,000 or more (Examples 1 to 3) compared to when using the binder including two types of lithium-substituted polyacrylic acid with a molecular weight difference of less than approximately 500,000 (Comparative Example 3).

When examining Comparative Example 4 of Table 1, the above-described effect for the capacity retention rate like Examples 1 to 3 was not able to be identified when using the binder including a polymer type different from lithium-substituted polyacrylic acid even when the molecular weights were different by approximately 500,000 or more.

When examining Comparative Examples 5 and 6 of Table 1, the above-described effect for the capacity retention rate was hardly obtained when the high molecular weight lithium-substituted polyacrylic acid (20% by weight to 70% by weight) or the low molecular weight lithium-substituted polyacrylic acid (30% by weight to 80% by weight) were included outside specific content ranges.

Experimental Example 2: Analysis on Adhesive Strength of Positive Electrode

Adhesive strength of each of the positive electrodes prepared according to the examples and the comparative examples was measured under the above-described analysis condition, and the results are shown in Table 2.

TABLE 2

|  | Adhesive Strength (gf/cm) | Note |
| --- | --- | --- |
| Example 1 | 8.1 | Measured 3 Times |
| Example 2 | More than 9 | Measured 3 Times |
| Example 3 | More than 9 | Measured 3 Times |
| Comparative Example 1 | 4.6 | Measured 3 Times |
| Comparative Example 2 | 4.5 | Measured 3 Times |
| Comparative Example 3 | 7.9 | Measured 3 Times |
| Comparative Example 4 | 1.8 | Measured 3 Times |
| Comparative Example 5 | 1.0 | Measured 3 Times |
| Comparative Example 6 | 3.7 | Measured 3 Times |

According to Table 2, it was identified that adhesive strength of the positive electrode was significantly enhanced when using the binder including two types of lithium-substituted polyacrylic acid with a molecular weight difference of approximately 500,000 or more (Examples 1 to 3) compared to when using lithium-substituted polyacrylic acid alone (Comparative Examples 1 and 2).

In addition, unlike the above-described capacity retention rate, adhesive strength did not significantly decrease when using the binder including two types of lithium-substituted polyacrylic acid with a molecular weight difference of less than approximately 500,000 (Comparative Example 3) compared to when using the binder including two types of lithium-substituted polyacrylic acid with a molecular weight difference of approximately 500,000 or more (Examples 1 to 3).

When examining Comparative Example 4 of Table 2, the above-described effect for the adhesive strength like Examples 1 to 3 was not able to be identified when using the binder including a polymer type different from lithium-substituted polyacrylic acid even when the molecular weights were different by approximately 500,000 or more.

When examining Comparative Examples 5 and 6 of Table 2, the above-described effect for the adhesive strength was hardly obtained when the high molecular weight lithium-substituted polyacrylic acid (20% by weight to 70% by weight) or the low molecular weight lithium-substituted polyacrylic acid (30% by weight to 80% by weight) were included outside specific content ranges.

Simple modifications or changes in the present invention all fall within the scope of the present invention, and the specific scope of the protection of the present invention will be apparent from the attached claims.

The invention claimed is:

1. A binder for a positive electrode of a lithium sulfur battery comprising:
   two or more different lithium-substituted polyacrylic acids, wherein the two or more lithium-substituted polyacrylic acids include two different lithium-substituted polyacrylic acids differing in weight average molecular weight by 500,000 or more from each other, and wherein the two or more lithium-substituted polyacrylic acids include a high molecular weight lithium-substituted polyacrylic acid having a weight average molecular weight of 1,000,000 to 2,000,000, and a low molecular weight lithium-substituted polyacrylic acid having a weight average molecular weight of 450,000 to 750,000.

2. The binder for a positive electrode of a lithium sulfur battery of claim 1, wherein the high molecular weight lithium-substituted polyacrylic acid is included in 20% by weight to 70% by weight based on a total of lithium-substituted polyacrylic acids.

3. The binder for a positive electrode of a lithium sulfur battery of claim 1, wherein the low molecular weight lithium-substituted polyacrylic acid is included in 30% by weight to 80% by weight based on a total of lithium-substituted polyacrylic acids.

4. The binder for a positive electrode of a lithium sulfur battery of claim 1, wherein the binder has a viscosity of 500 cP to 50,000 cP in an aqueous solution state of 2.5% by weight under a temperature condition of 25° C.

5. A composition for a positive electrode of a lithium secondary sulfur battery comprising:

the binder of claim 1;
a positive electrode active material; and
a conductor.

6. The composition for a positive electrode of a lithium sulfur battery of claim 5, wherein the composition comprises the binder in 0.01 parts by weight to 10 parts by weight with respect to 100 parts by weight of solids in the composition.

7. The composition for a positive electrode of a lithium sulfur battery of claim 5, wherein the composition comprises the positive electrode active material in 30 parts by weight to 95 parts by weight with respect to 100 parts by weight of solids in the composition.

8. The composition for a positive electrode of a lithium secondary sulfur battery of claim 5, wherein the composition comprises the conductor in 2 parts by weight to 65 parts by weight with respect to 100 parts by weight of solids in the composition.

9. A positive electrode comprising:
a current collector; and
a positive electrode active material layer formed by coating the composition of claim 5 on the current collector.

10. A lithium sulfur battery comprising the positive electrode of claim 9.

* * * * *